June 19, 1956 S. P. KISH 2,750,632
METHOD OF MAKING SURFACE REPRODUCTION FIXTURES
Filed July 28, 1952
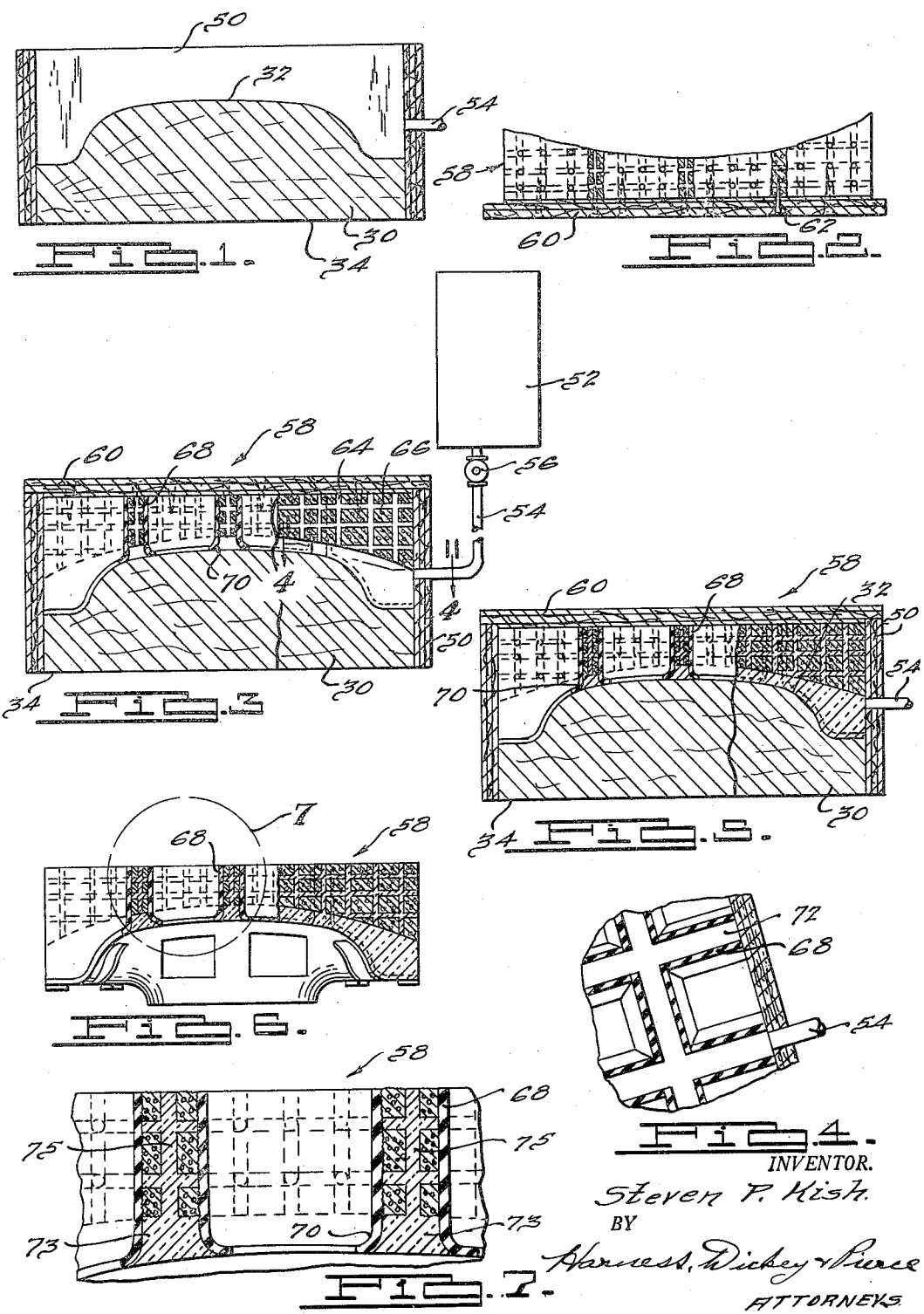
INVENTOR.
Steven P. Kish.
BY
Harness, Dickey & Pierce
ATTORNEYS

2,750,632
METHOD OF MAKING SURFACE REPRODUCTION FIXTURES

Steven P. Kish, Lansing, Mich., assignor to Kish Plastic Products, Inc., Lansing, Mich., a corporation of Michigan Application July 28, 1952, Serial No. 301,328

2 Claims. (Cl. 18—59)

This invention relates broadly to new and useful improvements in surface-reproduction fixtures such as female duplications, checking fixtures, spotting fixtures, and the like.

This application is a division of my copending application Serial No. 118,113, filed September 27, 1949, now Patent No. 2,632,922.

An important object of the present invention is to provide an improved method of making surface-reproduction fixtures of the above-mentioned character.

Another object of the invention is to provide an improved method of making a surface-reproduction fixture which is strong and rigid, light in weight, and weather-resistant.

Still another object of the invention is to provide an improved method which permits reproduction fixtures to be made faster and less expensively than heretofore.

Other objects and advantages of the invention will be apparent during the course of the following description.

In the drawing forming a part of this specification and wherein like numerals are employed to designate like parts throughout the same:

Fig. 1 is a transverse, sectional view through a mold for making a fixture embodying the invention.

Fig. 2 is a transverse, sectional view showing a lattice framework which comprises a part of the fixture construction;

Fig. 3 is a transverse, sectional view showing the core assembled on the mold and means for ejecting a plastic material or the like into the space between the core and the mold;

Fig. 4 is an enlarged, fragmentary, horizontal, sectional view taken on the line 4—4 of Fig. 3;

Fig. 5 is a transverse, sectional view similar to Fig. 3 but showing the space filled with plastic material;

Fig. 6 is a view similar to Fig. 5 but showing the fixture removed from the mold;

Fig. 7 is an enlarged, sectional view showing the portion of Fig. 6 enclosed in the circle 7.

The drawing shows a novel checking fixture and illustrates a highly efficient procedure for making the same. The procedure hereinafter described permits the fixture to be made relatively easily, quickly, and inexpensively.

For the purpose of illustration, a hood model 30 is here shown. According to the present invention, a form 50 is constructed around the model 30. The particular form here shown is generally rectangular in shape, and it will be observed that the form surrounds and snugly fits the model 30. Also, the form 50 extends substantially above the top surface of the model as perhaps best shown in Fig. 1. A container 52 for a suitable, hardenable plastic material is shown diagrammatically in Fig. 3, and the container is connected to the space above the model 30 by a pipe 54. In this connection it will be observed that the pipe 54 extends from the bottom of tank 52, and the terminal end thereof extends through one side wall of the frame 50 above the model 30. Flow of plastic material through pipe 54 is controlled by a valve 56.

A lattice framework 58 of expanded polystyrene, for example, is next constructed and attached to transverse supporting bars 60. Each of the lattice bars is formed with a plurality of laterally spaced vertical bores 64 which extend entirely therethrough from top to bottom and a plurality of vertically spaced horizontal bores 66 which extend entirely therethrough from end to end and intersect the vertical bores 64. By reason of this construction each lattice bar is formed with a network of intersecting, vertical and horizontal bores, and the network opens at a multiplicity of points through the undersurface of the framework. Any suitable means such as the small wire brads 62 may be employed to fasten the bars 60 to the framework 58. In this connection it will be observed that the framework 58 fits snugly within the form 50 and that the supporting bars 60 project laterally beyond the framework. When the frame 58 is set in the form 50 as shown in Fig. 3, the projecting terminal portions of bar 60 rest on the top edges of the form and support the framework spaced above the model 30 as shown in Fig. 3.

After the lattice framework 58 has been set into and supported on the mold 50, the spaces between the lattice bars and the model are masked off by strips 64 of sheet wax, rubber, or the like. As clearly shown in the drawings, the strips 64 are placed flatly against the sides of the lattice bars so that they entirely cover the sides of the bars, and so that they extend downwardly therefrom to the top surface of the model 30. Preferably, the lower edges of the strips 68 are bent slightly outwardly against the surface of the model as at 70 to assure a close-fitting, continuous engagement between the strips and the model. Thus, the strips 68 co-operate to define a network of interconnecting channels 72 between the lattice bars and the model 30. In this connection it should be noted that the pipe 54 is so located on the form 50 as to open into or communicate with one of the channels 72.

After the masking operation is completed, plastic material from the tank 52 is introduced into the channel network 72. In the particular arrangement here shown by way of illustration, the plastic material flows by gravity into the channel so as to entirely fill the same and also flows into the vertical and horizontal passages 64 and 66. As the plastic material rises in the cavity it displaces air and thus prevents air from forming in the material or from being trapped between the plaster and the model 30. In practice, the plastic material may be permitted to rise to any desired height in the framework passages 64 and 66. In practice, however, I prefer to permit the plastic material to flow into the channel network 72 until the passages 64 are substantially entirely filled. Any suitable plastic material may be employed for this purpose. Urea and phenol formaldehyde resins are typical examples of such plastic materials and, as in the form of the invention first described, the resins may be either acid setting or thermosetting. In this form of the invention, however, I prefer to use thermosetting resins, since they do not harden as quickly as the acid-setting resins and since the presence of the form 50 makes the initial fluidity of the resin relatively unimportant. If a thermosetting resin is employed, the entire mold assembly is placed in a baking oven or otherwise subjected to heat sufficient to harden or set the resin.

After the resin has hardened, the fixture is separated from the model 30, and the supporting bars 62 and masking strips 68 are removed from the lattice framework 58. The resulting product is a strong, rigid frame having a plastic facing 73 which conforms precisely to the top surface of the model. By reason of the unique manner in which the fixture is made, the plastic material extends upwardly into passages 64 and 66 so as to solidly fasten and securely interlock the plastic facing 73 with the strengthening and reinforcing lattice framework. The plastic material in passages 64 and 66 in effect constitute integral, fused extensions 75 on the plastic facing 73, which extensions are physically interlocked and interconnected with the lattice bars. By reason of this construction the plastic facing 73 is attached to the lattice bars at a multiplicity of points so that there is very little, if any, possibility of the facing separating or breaking away from the supporting framework. Also, by reason of the instant construction, the fixture is open, as perhaps best shown in Figs. 6 and 7, so that the surface being checked can be readily inspected or gauged.

Having thus described the invention, I claim:

1. The method of making a surface-reproduction fixture comprising spacing above the surface to be reproduced a core of essentially dimensionally stable material having cavities opening downwardly into the space between the core and said surface; masking off the space between the core and said surface with flexible dams extending between side faces of the core and bearing against said surface to be reproduced; then introducing a hardenable plastic material having substantially the same coefficient of thermal expansion as said core material into the masked-off areas so that the material completely fills said areas and extends into the cavities of said core to physically interlock the material with the core; and then hardening the plastic material.

2. The method of making a surface-reproduction fixture comprising forming a lattice framework of a dimensionally stable material; providing interconnecting passages in the lattice arms at least some of which open through the undersurface of such arms; spacing the framework above the surface to be reproduced with the undersurfaces of the lattice bars spaced from said surface to be reproduced; masking off the space between the lattice arms and the surface to be reproduced with flexible dams extending between side faces of the core and bearing against said surface to be reproduced; then introducing a hardenable plastic material having substantially the same coefficient of thermal expansion as the material from which said lattice framework is made into the masked-off areas so that the material entirely fills such areas and extends into the passages provided in the lattice bars; and then hardening said plastic material to form a plastic shell on the undersurfaces of the lattice arms, which shell accurately reproduces the mentioned surface and is physically fastened to and interlocked with the lattice framework.

References Cited in the file of this patent

UNITED STATES PATENTS

| | | |
|---|---|---|
| 2,460,242 | Renaud | Jan. 25, 1949 |
| 2,516,091 | Renaud | July 18, 1950 |